US008285151B2

(12) United States Patent
Shen et al.

(10) Patent No.: US 8,285,151 B2
(45) Date of Patent: Oct. 9, 2012

(54) METHOD AND SYSTEM FOR HYBRID INTEGRATED 1XN DWDM TRANSMITTER

(75) Inventors: Xiao Andy Shen, San Bruno, CA (US); Yu Sheng Bai, Los Altos Hills, CA (US)

(73) Assignee: Futurewei Technologies, Inc., Plano, TX (US)

( * ) Notice: Subject to any disclaimer, the term of this patent is extended or adjusted under 35 U.S.C. 154(b) by 898 days.

(21) Appl. No.: 11/866,951

(22) Filed: Oct. 3, 2007

(65) Prior Publication Data

US 2008/0095536 A1 Apr. 24, 2008

Related U.S. Application Data

(60) Provisional application No. 60/862,391, filed on Oct. 20, 2006.

(51) Int. Cl.
*H04B 10/04* (2006.01)
(52) U.S. Cl. .................. 398/200; 398/142; 398/164
(58) Field of Classification Search .............. 398/79, 398/87, 164, 183, 200, 201, 142
See application file for complete search history.

(56) References Cited

U.S. PATENT DOCUMENTS

| | | | |
|---|---|---|---|
| 3,204,418 A | 9/1965 | Mathews | |
| 5,061,032 A | 10/1991 | Meltz et al. | |
| 5,206,920 A | 4/1993 | Cremer et al. | |
| 5,349,821 A | 9/1994 | Schrage | |
| 5,488,678 A | 1/1996 | Taneya et al. | |
| 5,617,234 A | 4/1997 | Koga et al. | |
| 6,027,254 A * | 2/2000 | Yamada et al. | 385/88 |
| 6,064,783 A | 5/2000 | Congdon et al. | |
| 6,108,472 A | 8/2000 | Rickman et al. | |
| 6,122,934 A | 9/2000 | Narita et al. | |
| 6,192,170 B1 | 2/2001 | Komatsu | |
| 6,219,470 B1 | 4/2001 | Tu | |

(Continued)

FOREIGN PATENT DOCUMENTS

CN 1252654 A 5/2000

(Continued)

OTHER PUBLICATIONS

Hashimoto, "Multichip Optical Hybrid Integration Technique with Planar Lightwave Circuit Platform", Journal of Lightwave Technology, Jul. 1998, pp. 1249-1258, vol. 16, No. 7.

(Continued)

*Primary Examiner* — Dzung Tran

(57) ABSTRACT

An integrated DWDM transmitter apparatus includes a silica-on-silicon substrate overlying a first support component. The silica-on-silicon substrate includes a silica layer overlying a silicon layer. A coefficient of thermal expansion of the first support component is substantially matched to a coefficient of thermal expansion of the silicon layer. An optical multiplexer is located within the silica layer and includes a plurality of input waveguides and at least an output waveguide. Additionally, the apparatus includes a second support component attached to a side surface of the first support component. One or more semiconductor laser array chips overlie the second support component. A coefficient of thermal expansion of the one or more semiconductor chips is substantially matched to a coefficient of thermal expansion of the second support component. Moreover, each of the one or more laser array chips includes one or more lasers, each of which is optically coupled to a corresponding one of the plurality of input waveguides.

31 Claims, 7 Drawing Sheets

U.S. PATENT DOCUMENTS

| | | |
|---|---|---|
| 6,356,692 B1 | 3/2002 | Ido et al. |
| 6,377,725 B1 | 4/2002 | Stevens et al. |
| 6,393,185 B1 | 5/2002 | Deacon |
| 6,445,477 B1 | 9/2002 | Madsen et al. |
| 6,486,440 B1 | 11/2002 | Crafts et al. |
| 6,539,725 B2 | 4/2003 | Bell |
| 6,556,752 B2 | 4/2003 | Fang et al. |
| 6,567,198 B1 | 5/2003 | Kang |
| 6,628,850 B1 | 9/2003 | Yao |
| 6,757,499 B1 | 6/2004 | Aoki |
| 6,865,304 B1 | 3/2005 | Ticknor |
| 6,865,320 B1 | 3/2005 | Westbrook |
| 6,873,763 B2 | 3/2005 | Nikonov |
| 6,952,504 B2 | 10/2005 | Bi et al. |
| 7,050,666 B2 | 5/2006 | Welch et al. |
| 7,058,245 B2 | 6/2006 | Farahi |
| 7,062,114 B2 | 6/2006 | Webjorn et al. |
| 7,203,401 B2 | 4/2007 | Mossberg et al. |
| 7,245,379 B2 | 7/2007 | Schwabe |
| 7,447,393 B2 | 11/2008 | Yan et al. |
| 7,460,742 B2 | 12/2008 | Joyner |
| 7,483,599 B2 | 1/2009 | Kish, Jr. et al. |
| 2001/0041025 A1 | 11/2001 | Farahi |
| 2001/0052234 A1 | 12/2001 | Venkatasubramanian |
| 2003/0006224 A1 | 1/2003 | Crafts et al. |
| 2003/0016415 A1 | 1/2003 | Jun et al. |
| 2003/0039015 A1 | 2/2003 | Vujkovic-Cvijin et al. |
| 2003/0095737 A1* | 5/2003 | Welch et al. .................. 385/14 |
| 2004/0005133 A1 | 1/2004 | Johannessen |
| 2004/0067006 A1 | 4/2004 | Welch et al. |
| 2004/0081410 A1 | 4/2004 | Aronson et al. |
| 2004/0131302 A1 | 7/2004 | Kouta et al. |
| 2004/0208444 A1 | 10/2004 | Grunnet-Jepsen et al. |
| 2005/0018951 A1* | 1/2005 | Mossberg et al. .............. 385/14 |
| 2005/0068536 A1 | 3/2005 | Schwabe |
| 2005/0094926 A1 | 5/2005 | Dominic et al. |
| 2005/0100290 A1 | 5/2005 | Huang |
| 2005/0100345 A1* | 5/2005 | Welch et al. .................. 398/183 |
| 2005/0163171 A1 | 7/2005 | Ng et al. |
| 2005/0210883 A1 | 9/2005 | Bell |
| 2006/0002443 A1 | 1/2006 | Farber et al. |
| 2006/0141649 A1* | 6/2006 | Joyner et al. .................. 438/31 |
| 2006/0193553 A1 | 8/2006 | Mossberg et al. |
| 2006/0279734 A1 | 12/2006 | Yan et al. |
| 2007/0268489 A1 | 11/2007 | Schwabe |
| 2008/0070610 A1 | 3/2008 | Nishio |
| 2009/0087138 A1 | 4/2009 | Yan et al. |

FOREIGN PATENT DOCUMENTS

| | | |
|---|---|---|
| CN | 1287542 A | 3/2001 |
| CN | 1303195 A | 7/2001 |
| CN | 1423140 A | 6/2003 |
| CN | 1453599 A | 11/2003 |
| CN | 1553239 A | 12/2004 |
| CN | 1639614 A | 7/2005 |
| EP | 0 495 413 A1 | 7/1992 |
| EP | 0 497 358 A1 | 8/1992 |
| EP | 0 573 724 A1 | 12/1993 |
| EP | 1 028 503 A2 | 8/2000 |
| EP | 1 218 781 | 3/2001 |
| EP | 1 133 082 A1 | 9/2001 |
| EP | 1 436 931 B1 | 12/2005 |
| JP | 05323246 A | 12/1993 |
| JP | 06-089955 | 3/1994 |
| JP | 09-83056 A | 3/1997 |
| JP | 10233548 A | 9/1998 |
| JP | 11125727 A | 5/1999 |
| JP | 11202159 A | 7/1999 |
| JP | 11211924 A | 8/1999 |
| JP | 2000121870 A | 4/2000 |
| JP | 2000162455 | 6/2000 |
| JP | 2000174397 A | 6/2000 |
| JP | 2000236135 A | 8/2000 |
| JP | 2000249853 A | 9/2000 |
| JP | 2000294809 A | 10/2000 |
| JP | 2001051136 A | 2/2001 |
| JP | 2001051142 A | 2/2001 |
| JP | 2001111156 A | 4/2001 |
| JP | 2001/147336 A | 5/2001 |
| JP | 2001127377 A | 5/2001 |
| JP | 2001228021 A | 8/2001 |
| JP | 2001244571 A | 9/2001 |
| JP | 2002006158 A | 1/2002 |
| JP | 2002055249 A | 2/2002 |
| JP | 2002258080 A | 9/2002 |
| JP | 2003014994 A | 1/2003 |
| JP | 2003508814 T | 3/2003 |
| JP | 2003513328 T | 4/2003 |
| JP | 2004086185 A | 3/2004 |
| JP | 2005010373 | 1/2005 |
| JP | 2005215942 A | 8/2005 |
| JP | 2005531818 A | 10/2005 |
| JP | 2006230236 A | 9/2006 |
| JP | 2009197457 A | 9/2009 |
| WO | WO 01/33268 A1 | 5/2001 |
| WO | WO 2005/013446 A1 | 2/2005 |
| WO | WO 2006/019362 A1 | 2/2006 |
| WO | WO 2008/043288 A1 | 4/2008 |
| WO | WO 2008/043318 A1 | 4/2008 |
| WO | WO 2008/049372 A1 | 5/2008 |
| WO | WO 2008/122221 A1 | 10/2008 |

OTHER PUBLICATIONS

Hashimoto, "Hybrid Integration of Spot-Size Converted Laser Diode on Planar Lightwave Circuit Platform by Passive Alignment Technique", IEEE Photonics Technology Letters, Nov. 1996, pp. 1504-1506, vol. 8, No. 11.

Henry, "Glass Waveguides on Silicon for Hybrid Optical Packaging", Journal of Lightwave Technology, Oct. 1989, pp. 1530-1539, vol. 7, No. 10.

Kaneko, "Design and Applications of Silica-Based Planar Lightwave Circuits", IEEE Journal of Selected Topics in Quantum Electronics, Sep./Oct. 1999, pp. 1227-1236, vol. 5, No. 5.

Ketelsen, "Multiwavelength DFB Laser Array with Integrated Spot Size Converters", IEEE Journal of Quantum Electronics, Jun. 2000, pp. 641-648, vol. 36, No. 6.

Koch, "Tapered Waveguide InGaAs/InGaAsp Multiple-Quantum-Well Lasers", IEEE Photonics Technology Letters, Feb. 1990, pp. 88-90, vol. 2, No. 2.

Lealman, "1.56 µm InGaAsP/InP Tapered Active Layer Multiquantum Well Laser with Improved Coupling to Cleaved Singlemode Fibre", Electronics Letters, May 26, 1994, pp. 857-859, vol. 30, No. 11.

Liu, "Comparison Between Epi-Down and Epi-Up Bonded High-Power Single-Mode 980-nm Semiconductor Lasers", IEEE Transactions on Advanced Packaging, Nov. 2004, pp. 640-646, vol. 27, No. 4.

Ogawa, "Reduction of Waveguide Facet Reflection in Optical Hybrid Integrated Circuit Using Saw-Toothed Angled Facet", IEEE Photonics Technology Letters, Jan. 1995, pp. 44-46, vol. 7, No. 1.

Tohmori, "Spot-size Converted 1.3 µm Laser with Butt-Jointed Selectively Grown Vertically Tapered Waveguide", Electronics Letters, Jun. 22, 1995, pp. 1069-1070, vol. 31, No. 13.

Kwong et al., "Novel Single Mode Laser Fabrication Using Focus Ion Beam (FIB) Etching," Optical Fiber Communication Conference, 2006 and the 2006 National Fiber Optic Engineers Conference 2006, Mar. 5-10, 2006 3 pages.

Li, et al. "Hybrid Integration", Optical Fiber Telecommunications IIIB, Lucent Technologies 1997, p. 367-368.

Yoshikuni, Yuzo, "Semiconductor Arrayed Waveguide Gratings for Photonic Integrated Devices," IEEE Journal of Selected Topics in Quantum Electronics, vol. 8, No. 6, Nov./Dec. 2002.

Zirngibl, et al., "WDM receiver by monolithic integration of an optical preamplifier, waveguide grating router and photodiode array," Electronics Letters, vol. 31, No. 7, p. 581, (Mar. 30, 1995).

S.Y. Huang et al., "Performance and Reliability of Redundant Thermoelectric Coolers", Electronic Components and Technology Conference, May 11-16, 1991, p. 34-37.

T. Ohyama et al., "4-Channel x 10-Gbit/s Hybrid Integrated Multiwavelength Laser Module Using Silica-Based Planar Lightwave Circuit Platform with 1.5%.-Δ", 28th European Conference on Optical Communication, 2002, vol. 2, Integration and Modules 5.4. t, 2 pages.

Marko Lackovic, et al., "Sensitivity Analysis of Component Failures in the Switched WDM Network", In Proceedings of Optical Networking Design and Modeling (ONDM) (Ghent, Belgium, Feb. 2-4, 2004), p. 205-224.

Radhakrishnan Nagarajan, et al., "Large -Scale Photonic Integrated Circuits", IEEE Journal of Selected Topics in Quantum Electronics, vol. 11, No. 1, Jan./ Feb. 2005, p. 50-65.

International Search Report and Written Opinion of PCT Application No. PCT/CN2007/071128, date of mailing Mar. 20, 2008.

K.S. Feder, et al., "In-Fiber Spectrometer Using Tilted Fiber Gratings", IEEE Photonics Technology Letters, vol. 15, No. 7, Jul. 2003, p. 933-935.

P.S. Westbrook, et al., "In-Line Polarimeter Using Blazed Fiber Gratings", IEEE Photonics Technology Letters, vol. 12, No. 10, Oct. 2000, p. 1352-1354.

International Search Report and Written Opinion of PCT Application No. PCT/CN2007/070806, date of mailing Dec. 6, 2007.

Communication pursuant to Article 94(3) EPC dated Apr. 30, 2010 in connection with European Patent Application No. 07 816 997.6.

Partial Translation of Office Action dated Jun. 2, 2010 in connection with Chinese Patent Application No. 200780029963.2.

Xingsheng Liu, et al., "Comparison Between Epi-Gown and Epi-Up Bonded High-Power Single-Mode 980-nm Semiconductor Lasers", IEEE Transactions on Advanced Packaging, vol. 27, No. 4, Nov. 2004, p. 640-646.

A. Tervonen, et al., "Control of wavelength alignment in wavelength division multiple access passive optical network", Electronics Letters, Jan. 23, 2003, vol. 39, No. 2, 2 pages.

Marko Labudovic, et al., "Heat Transfer and Residual Stress Modeling of a Diamond Film Heat Sink for High Power Laser Diodes", IEEE Transactions on Components and Packaging Technologies, vol. 26, No. 3, Sep. 2003, p. 575-581.

Communication pursuant to Article 94(3) EPC dated May 27, 2009 in connection with European Patent Application No. 07 817 120.4.

Supplementary European Search Report dated Jan. 14, 2009 in connection with European Patent Application No. 07 817 120.4.

Translation of Office Action dated Nov. 12, 2010 in connection with Chinese Patent Application No. 200780018559.5.

Decision to refuse a European Patent Application dated Mar. 29, 2010 in connection with European Patent Application No. 07 817 120.4.

Summons to attend oral proceedings pursuant to Rule 115(1) EPC dated Oct. 13, 2009 in connection with European Patent Application No. 07 817 120.4.

Karsten Drogemuller, "Cost Effective Multi Optical Channel DWDM Transmitter Modules for the Metro Market", 2001 IEEE, p. 109-110.

Communication pursuant to Article 94(3) EPC dated May 27, 2009 in connection with European Patent Application No. 07 801 079.0.

Supplementary European Search Report dated Nov. 5, 2009 in connection with European Patent Application No. 08 71 5157.

Notification of Transmittal of the International Search Report and the Written Opinion of the International Searching Authority, or the Declaration dated May 15, 2008 in connection with International Patent Application No. PCT/CN2008/070421.

Notice of Reasons for Rejection dated Mar. 22, 2011 in connection with Japanese Patent Application No. 2008-548920.

Written Opion of the International Searching Authority dated Dec. 20, 2007 in connection with International Patent Application No. PCT/CN2007/070671.

Translation of Office Action dated Sep. 26, 2010 in connection with Chinese Patent Application No. 200780029963.2.

Translation of Office Action dated Feb. 9, 2011 in connection with Chinese Patent Application No. 200780029963.2.

Su Hwan Oh, et al., "Fabrication of WDM-PON OLT Source using External Cavity Laser", The 5th International Conference on Optical Internet (COIN 2006), Jul. 9-13, 2006, p. 217-219.

Summons to attend oral proceedings pursuant to Rule 115(1) EPC dated Sep. 22, 2011 in connection with European Patent Application No. 07 801 079.0.

Notice of Reasons for Rejection dated Mar. 22, 2011 in connection with Japanese Patent Application No. 2008-552667.

Translation of Office Action dated Nov. 21, 2008 in connection with Chinese Patent Application No. 200780018559.5.

Translation of Office Action dated Aug. 10, 2011 in connection with Chinese Patent Application No. 200780018559.5.

Provision of a copy of the minutes in accordance with Rule 124(4) EPC dated Mar. 7, 2012 in connection with European Patent Application No. 07 801 079.0.

Second Auxiliary Request dated Dec. 16, 2011 in connection with European Patent Application No. 07 801 079.0.

* cited by examiner

METHOD AND SYSTEM FOR HYBRID INTEGRATED 1XN DWDM TRANSMITTER

CROSS-REFERENCES TO RELATED APPLICATIONS

This application claims priority to U.S. Provisional Patent Application No. 60/862,391, filed Oct. 20, 2006, commonly assigned, incorporated herein by reference for all purposes.

Additionally, this application is related to co-pending U.S. patent application Ser. No. 11/844,969, filed Aug. 24, 2007, which is a continuation-in-part of U.S. patent application Ser. No. 11/696,472, filed Apr. 4, 2007, which claims priority to U.S. Provisional Patent Application No. 60/827,825, filed Oct. 2, 2006, all commonly assigned. The entire content of U.S. patent application Ser. No. 11/696,472 and U.S. patent application Ser. No. 11/844,969 are hereby incorporated by reference for all purposes.

BACKGROUND OF THE INVENTION

The present invention is directed to fiber optical transport systems. More particularly, the invention provides a method and system for integrating semiconductor (InP) laser/modulator chips on an aluminum nitride submount with a silica/silicon AWG. Merely by way of example, the invention has been applied to a wavelength multiplexed transmitter array. But it would be recognized that the invention has a much broader range of applicability.

Since its deployment in the middle of 1990s, dense wavelength division multiplexing (DWDM) has become a dominant technology for all long haul and regional backbone transport networks, and is gradually making its way to metro area networks. As the technology is maturing, the cost for making such systems and related components has been decreasing. Now the price bottleneck is moving toward the packaging cost of each individual optical component, such as lasers, modulators, and MUX/DEMUX filters.

Currently optical components in a DWDM transport system are individually packaged. The packaging cost of these components (e.g., a 10 G transmitter) becomes a bottleneck, preventing further reduction in price. For example, the cost of a bare DFB laser chip is only a few dollars, while a packaged DFB laser sells for several hundred dollars. Thus, for a DWDM system vendor to be competitive, it is desirable to remove this price bottleneck, making the packaging cost a less concern in manufacturing optical components.

In a conventional DWDM transport system, each optical component, either a laser or a MUX filter, is individually packaged. For example, a line card is built around a transmitter/receiver module which includes a laser, a modulator (or an integrated laser/modulator) and a receiver. The laser comes typically as an InP chip sitting inside a Butterfly package. The optical output of the line card is combined with other line cards of different wavelengths via a wavelength multiplexer which often includes an arrayed waveguide grating (AWG) made of silica-on-silicon. These line cards are connected to the multiplexer card using fiber jumpers and the combined optical output is then amplified before launching into a fiber network.

Even though these conventional DWDM systems are useful in some areas, they have many limitations that restrict their effectiveness in broader applications. Some of these limitations are discussed below, and improved techniques based on embodiments of the present invention are presented.

BRIEF SUMMARY OF THE INVENTION

The present invention is directed to fiber optical transport systems. More particularly, the invention provides a method and system for integrating semiconductor (InP) laser/modulator chips on an aluminum nitride submount with a silica/silicon AWG. Merely by way of example, the invention has been applied to a wavelength multiplexed transmitter array. But it would be recognized that the invention has a much broader range of applicability.

According to a specific embodiment of the invention, an integrated DWDM transmitter apparatus includes a first support component and a silica-on-silicon substrate overlying the first support component. The silica-on-silicon substrate includes a silica layer overlying a silicon layer. A coefficient of thermal expansion of the first support component is substantially matched to a coefficient of thermal expansion of the silicon layer. The apparatus also includes an optical multiplexer within the silica layer, which includes a plurality of input waveguides and at least an output waveguide. Additionally, the apparatus includes a second support component attached to a side surface of the first support component. One or more semiconductor laser array chips are mounted to overlie the second support component. A coefficient of thermal expansion of the one or more semiconductor chips is substantially matched to a coefficient of thermal expansion of the second support component. Moreover, each of the one or more laser array chips includes one or more lasers, each of which is optically coupled to a corresponding one of the plurality of input waveguides.

According to an alternative embodiment of the invention, an integrated DWDM transmitter apparatus includes a first support component and a silica-on-silicon substrate overlying the first support component. The silica-on-silicon substrate includes a silica layer overlying a silicon layer. A coefficient of thermal expansion of the first support component is substantially matched to a coefficient of thermal expansion of the silicon layer. The apparatus also includes an optical multiplexer within the silica layer, which includes a plurality of input waveguides and at least an output waveguide. Additionally, the apparatus includes a second support component attached to a side surface of the first support component. One or more semiconductor laser array chips are mounted to overlie the second support component. A coefficient of thermal expansion of the one or more semiconductor chips is substantially matched to a coefficient of thermal expansion of the second support component. Moreover, each of the one or more laser array chips includes one or more lasers, each of which is optically coupled to a corresponding one of the plurality of input waveguides. The transmitter apparatus also includes a plurality of micro heaters, each of the plurality of micro heaters being located adjacent to a correspond one of the one or more lasers. In a specific embodiment of the transmitter apparatus, each of the one or more semiconductor laser array chips includes one or more InP lasers, and the second support component comprises aluminum nitride (AlN).

According to another embodiment, the invention provides a method for making an integrated DWDM transmitter apparatus. The method includes forming an optical multiplexer in a silica-on-silicon substrate. The silica-on-silicon substrate includes a silica layer overlying a silicon layer, and the optical multiplexer has a plurality of input waveguides and at least an output waveguide. The method also includes providing a first support component. A coefficient of thermal expansion of the first support component is substantially matched to a coefficient of thermal expansion of the silicon layer. For example, the first support component can be a silicon substrate characterized by a thickness of approximately 1 mm. The method further includes attaching the silica-on-silicon substrate to the first support component. According to the method, a second support component is provided. Additionally, one or more semiconductor laser array chips are mounted to a top surface of the second support component. A coefficient of thermal expansion of the one or more semiconductor laser array chips is substantially matched to a coefficient of thermal expansion of the second support component. Each of the one or more semiconductor laser array chips includes one or more lasers. The method also includes aligning each of the one or more lasers to a corresponding one of the plurality of input waveguides for providing an optical coupling. Additionally, the method further includes attaching the second support component to the first support component.

According to yet another embodiment, the invention provides an integrated dense wavelength division multiplexing (DWDM) transmitter apparatus that converts multiple electrical signals to a multiple-channel DWDM signal. The apparatus includes a plurality of input terminals for receiving the multiple electrical signals. The apparatus also includes a first support component and a silica-on-silicon substrate overlying the first support component. The silica-on-silicon substrate includes a silica layer overlying a silicon layer. A coefficient of thermal expansion of the first support component is substantially matched to a coefficient of thermal expansion of the silicon layer. The apparatus further includes a second support component attached to the silica-on-silicon substrate and the first support component. One or more semiconductor laser array chips are mounted overlying the second support component. The one or more semiconductor laser array chips are coupled to the plurality of input terminals for receiving the multiple electrical signals and converting the multiple electrical signals to corresponding multiple optical signals. Each of the one or more laser array chips including one or more lasers. Additionally, the apparatus includes an optical multiplexer coupled to the one or more semiconductor laser array chips for converting the multiple optical signals to the multiple-channel DWDM signal. The optical multiplexer is located in the silica-on-silicon substrate which is mounted on the first support component, e.g., a second silicon substrate. The optical multiplexer includes a plurality of input waveguides each of which coupled to a corresponding laser for receiving a corresponding optical signal and at least an output waveguide for outputting the multiple-channel DWDM signal.

Many benefits are achieved by way of the present invention over conventional techniques. For example, in certain embodiments, the invention provides a method of integrating various optical components using excellent CTE match between InP and AlN as well as good thermal conductivity of AlN. According to embodiments of the present invention, the method is readily scaleable to large laser array chips for further reduction of cost and system footprint as well as increasing product reliability and manufacture yield. According to certain embodiments of the invention, large array chips can enable further improvements of optical coupling between AWG and transmitters. For example, vertical variation in height relative to the waveguides can be minimized from transmitter to transmitter if these transmitters are formed on a single array chip. In contrast, large array chips can not be used in conventional flip-chip bonding due to CTE mismatch and, therefore, the vertical height varies from chip to chip, giving rise to non-uniform coupling efficiencies.

Some embodiments of the present invention provides techniques that reduce the complexities in product manufacturing in that quality control can be easily carried out at different levels of the integration. For example, the laser array on AlN may be manufactured by a specialist, and the final integration can be reduced to a simple alignment of the array with AWG and can be manufactured by using conventional packaging houses in the industry. Therefore, performance deviation of the final product is minimal and its packaging yield may be substantially higher than integrating InP chips directly on PLC. In specific embodiments, techniques are provided for using a butt joint method for optical coupling between laser array and AWG. As a result, the coupling efficiency is expected to be high. In an embodiment, both laser/waveguide surfaces can be AR coated to reduce reflection loss as well as possible back reflection into the laser cavity for high laser performance and stability. In some embodiments, the invention provides a method and system for using micro heaters to adjust a center frequency of each individual laser in the transmitter.

Various additional objects, features, and advantages of the present invention can be more fully appreciated with reference to the detailed description and accompanying drawings that follows.

DETAILED DESCRIPTION OF THE INVENTION

Figure 1A:
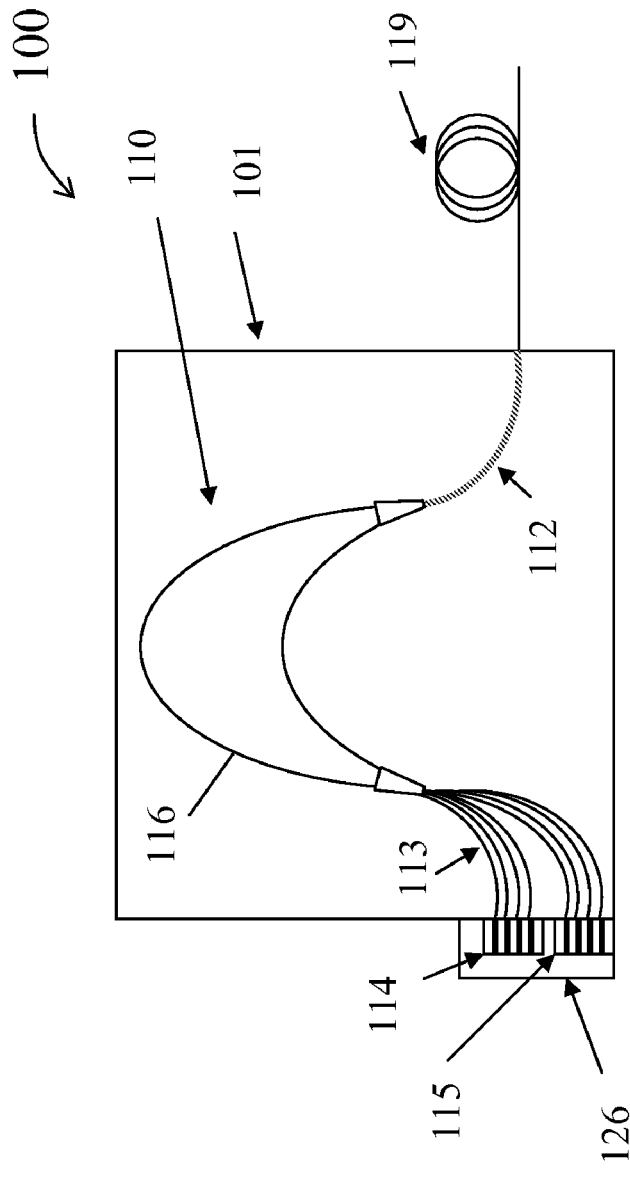
FIG. 1A is a simplified top view diagram of a hybrid integrated DWDM transmitter according to an embodiment of the present invention.

The present invention is directed to fiber optical transport systems. More particularly, the invention provides a method and system for integrating semiconductor (InP) laser/modulator chips on an aluminum nitride submount with a silica/silicon AWG. Merely by way of example, the invention has been applied to a wavelength multiplexed transmitter array. But it would be recognized that the invention has a much broader range of applicability.

As discussed above, the optical components in a conventional DWDM system are usually individually packaged. Discrete optical components often have large footprint and hence bulky in size. For example, a 10 G transmitter in a Butterfly package has typical dimensions of approximately 30×14×11.5 mm. If the line side of a DWDM system requires 12 such transmitters, it occupies a sizable space too large to fit onto a conventional line card. Multiple line cards and hence shelves are needed to support high DWDM channel counts, giving rise to a bottleneck in system dimensions. Furthermore, these multiple line cards need to be wavelength multiplexed by a multiplexer before launching into a network. Connection to the multiplexer card often requires a large number of fiber patch cores, increasing the complexity as well as cost of the fiber management.

There have been great efforts in the past several years to monolithically integrate multiple lasers, modulators, receivers, and AWG onto a single InP chip in an attempt to reduce the footprint of a DWDM terminal as well as simplifying fiber management and field deployment. However, conventional monolithic integration method relies heavily on InP technologies, which has yet to reach its maturity. The current yield of the technologies is low compared to silicon processing, even for single DWDM laser chips. With multiple elements integrated on the same chip, the yield may be expected to decrease exponentially. In addition, the passive AWG usually occupies much larger area of the integrated chip than the active elements, such as lasers and detectors, resulting in inefficient use of the expensive InP materials. The diameters of InP wafers are typically 2" or 3", as compared to 8" or even 12" for silicon wafer which is an order of magnitude larger. The processing cost per unit area for InP wafers can be two orders of magnitude higher than that for silicon wafers. The low chip yield, coupled with high processing cost, makes it uneconomical to monolithically integrate a DWDM transmitter.

An alternative technique involves hybrid integration. With the successful development of mode conversion (beam expanders) in the InP chips, hybrid integration of InP chips with PLC becomes feasible. Coupling loss from InP laser to PLC waveguide as low as 2 dB have been demonstrated and multiple hybrid integrated devices were fabricated. However, these hybrid integration approaches, although promising in increasing yield and reducing size, have other integration/packaging issues. For example, the base materials of the active/passive components in hybrid integration are often different due to different technologies. As a result, conventional hybrid integration methods suffer from many limitations.

In conventional hybrid techniques, semiconductor lasers or modulators are mostly InP-based, while AWG and other passive devices are silica/silicon based. The two materials have different thermal and mechanical properties. For example, the coefficient of thermal expansion (CTE) of InP is about 4.6 ppm/K, but CTE of silicon is ~3.0 ppm/K. The temperature for bonding the DMLs and the AWG is ~300° C., while the operating temperature of the transmitter is ~30° C. Thus a 2 mm chip about the size of a four DML lasers, will shrink by ~1.1 μm relative to the silicon substrate (AWG) after bonding. Such mismatch would not only affect the waveguide alignment, but also introduces strains on the laser chip, which could degrade laser performance, such as stain-induced line broadening. Another problem associated with CTE mismatch is the build-up of stress at the laser/PLC interface. This build-up will lead to the complexities in meeting the environmental requirements, for example, temperature cycling requirement between −65 and 75° C.

From the above, it is seen that an improved technique for integrating semiconductor (InP) laser/modulator chips with an AWG is desired.

FIG. 1A is a simplified top view diagram of a hybrid integrated DWDM transmitter according to an embodiment of the present invention. This diagram is merely an example, which should not unduly limit the scope of the claims herein. One of ordinary skill in the art would recognize other variations, modifications, and alternatives. As shown, hybrid integrated DWDM transmitter 100 includes a silicon bench 101. In a specific embodiment, the silicon bench 101 includes a silica-on-silicon substrate, i.e. a silica layer overlying a silicon substrate. Hybrid transmitter 100 also includes an optical multiplexer in the silicon bench. In a specific embodiment, the optical multiplexer includes an arrayed waveguide grating (AWG) 110 made in a silica-on-silicon planar lightwave circuit (PLC) in the silicon bench. Hybrid transmitter 100 further includes one or more multiple laser array chips, e.g., 114 and 115 mounted on a support component, for example, submount 126. In a preferred embodiment, the laser array chips include DML lasers made in InP. In a specific embodiment, each InP laser array chip includes two or more lasers. Of course, there can be other variations, modifications, and alternatives.

In a specific embodiment, the AWG 110 includes one optical output port 112, multiple input ports 113, and grating waveguides 116. In an embodiment, the output port 112 is optically coupled to an optical fiber 119, which may be coupled to an optical transmission system. The output and input ports, for example, can all be implemented in the form of waveguides. In a specific embodiment, the grating waveguides 116 include a number of waveguides for coupling to the input and output ports. These waveguides have varying lengths for performing wavelength division multiplexing and demultiplexing functions. In some embodiments, each input port of the AWG has a center wavelength and pass band associated with light transmission.

Figure 1B:
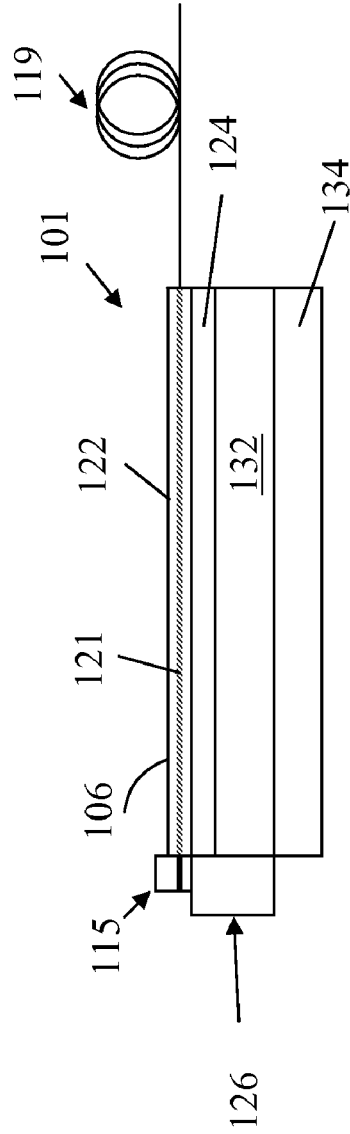
FIG. 1B is a simplified cross-sectional view diagram of the hybrid integrated DWDM transmitter of FIG. 1A according to an embodiment of the invention.

FIG. 1B is a simplified cross-sectional view diagram of the hybrid integrated DWDM transmitter 100 according to an embodiment of the invention. This diagram is merely an example, which should not unduly limit the scope of the claims herein. One of ordinary skill in the art would recognize other variations, modifications, and alternatives. As shown, a waveguide includes doped silica region 121 enclosed in an undoped silica layer 122 on a silicon substrate 124. In a specific embodiment, the doped silica region 121 has a higher index of refraction than the undoped silica region. In a specific example, the doped silica region 121 has an index of refraction of about 1.47, and the undoped silica region has an index of refraction of about 1.45.

According to certain embodiments of the present invention, integrated transmitter 100 includes one or more laser array chips, and each laser array chip may include two or more lasers. In the specific embodiment shown in FIG. 1A, the integrated transmitter 100 includes two direct-modulated laser (DML) array chips 114 and 115.

As shown in FIG. 1B, the DML array chips are mounted on a submount 126. In an example, the DML array chips are soldered on an aluminum nitride (AlN) submount 126. Further, the silicon substrate 124 is mounted on a silicon submount 132, as shown in FIG. 1B. The AlN submount 126 is attached to the silicon submount 132. In a specific embodiment, the submount 132 is mounted on a temperature adjustment component 134, such as a thermal electric cooler (TEC).

As shown in FIGS. 1A and 1B, the hybrid integrated DWDM transmitter 100 includes an arrayed waveguide grating (AWG) made of silica-on-silicon planar lightwave circuit (PLC) and one or more multiple direct-modulated laser (DML) array chips made of InP. Depending on the embodiments, the laser chips are mounted on an aluminum nitride (ALN) submount in either an epi-down (epitaxial-growth-surface-down) or epi-up geometry to form a transmitter array and then butt join with AWG for wavelength multiplexing. In certain embodiments, the AWG has one optical output port and multiple (N) input ports, all in the form of waveguides. Each input port transmits light at pre-selected wavelength defined by ITU-T standards (for example, 193.1 THz) with a known width of the pass band.

In a specific embodiment, each DML array can include more than one DML. For example, the DMLs can be of the types of distributed feedback (DFB) lasers and hence are operated in single frequency mode. The spacing between two adjacent DMLs matches with that of the waveguides along with their operating wavelengths for efficient transmission. More generally, in alternative embodiments, the DML arrays can also be single DML chips. The DMLs can also be substituted by integrated CW lasers and modulators, for example, an integrated DFB laser with an electro-absorption (EA) modulator. The lasers can also be distributed Bragg grating (DBR) lasers. Of course, there can be other variations, modifications, and alternatives.

According to embodiments of the invention, to minimize the CTE mismatch, the chips are mounted on to an aluminum nitride submount. Thermal mismatch problems can occur with some submount materials. For example, when solder (e.g., AuSn) solidifies after chip attach, it freezes the chip to the submount. As the assembly is cooled from the solder's solidus point (e.g., 280° C.) to room temperature, different CTE of the chip and the submount can introduce undesirable stresses into the laser structure. This effect is often more severe the harder the solder and the higher the temperature difference between the solder's solidus point and operating temperature.

According to embodiments of the present invention, aluminum nitride (AlN) has certain desirable properties as a submount material. For example, its CTE (4.5 ppm/K) is closely matched to that of InP. This property can minimize undesirable stresses on the laser structure, both those frozen-in after chip mounting and those arising from thermal cycling during device operation. In addition, high-grade AlN has been known to exhibit high thermal conductivity of 230 W/m·K at room temperature. Although not as high as other materials such as Cu, this value is 3 times higher than the thermal conductivity of InP (70 W/m·K at room temperature), which naturally enhances heat transfer from the laser's active zone into the heat sink by reducing thermal resistance in the epi-down or epi-up geometry.

Moreover, AlN is an electrical insulator, hence it permits easy formation of electrical interconnects on the submount for incorporating various passive monitoring elements into the integrated chip on carrier (CoC) assembly. Therefore, according to embodiments of the invention, the AlN/AuSn system simultaneously ensures high thermal performance of the mounted semiconductor lasers and offers the benefits of highly scalable, manufacturing-level fabrication. In some embodiments of the present invention, ALN holds promise to eventually enable economical mass production of high-performance, high-reliability, low-cost integrated DWDM transmitters. In alternative embodiments of the present invention, other materials with similar properties to AlN can also be used as the laser submount.

Figure 2A:
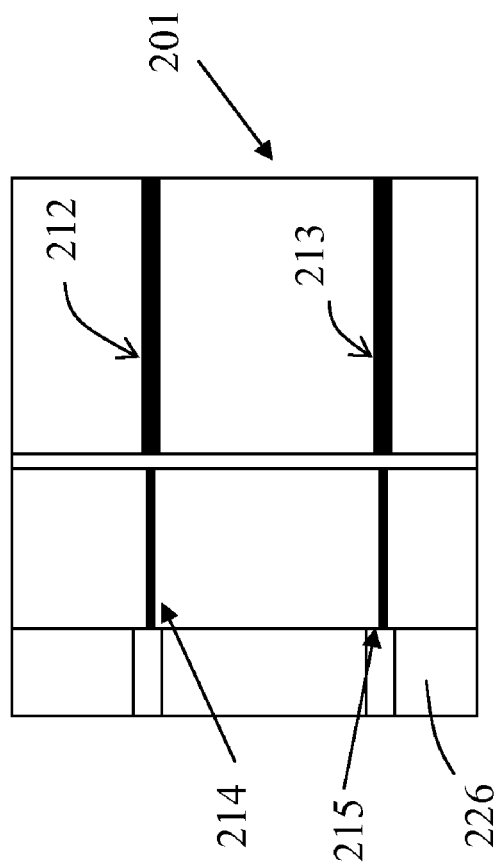
FIG. 2A is a simplified expanded top view diagram of a hybrid integrated DWDM transmitter according to an embodiment of the present invention.
Figure 2B:
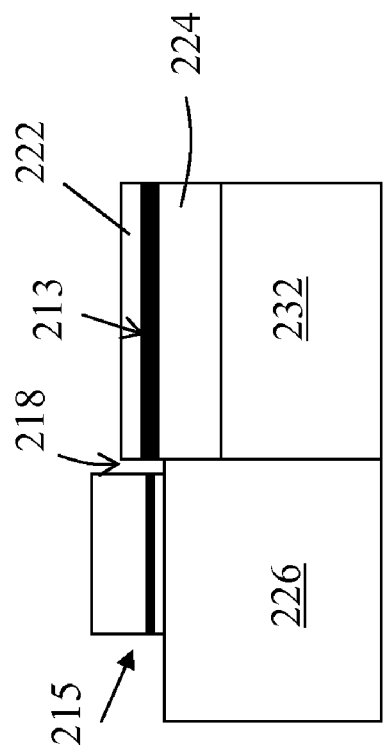
FIG. 2B is a simplified expanded cross-sectional view diagram of a hybrid integrated DWDM transmitter of FIG. 2A according to an embodiment of the invention.

FIG. 2A is a simplified expanded top view diagram of a hybrid integrated DWDM transmitter according to an embodiment of the present invention. FIG. 2B is a simplified expanded cross-sectional view diagram of a hybrid integrated DWDM transmitter of FIG. 2A according to an embodiment of the invention. These diagrams are merely examples, which should not unduly limit the scope of the claims herein. One of ordinary skill in the art would recognize other variations, modifications, and alternatives.

As shown in FIG. 2A, hybrid integrated DWDM transmitter 200 includes waveguides 212 and 213 that are coupled to an optical multiplexer, such as an arrayed waveguide grating (AWG) (not shown). As an example, the waveguides and the AWG are made in silica-on-silicon planar lightwave circuit (PLC), as described in FIG. 1A. Integrated transmitter 200 also includes lasers 214 and 215 mounted on submount 226. Examples of lasers are discussed above in connection with FIGS. 1A and 1B.

FIG. 2B shows silica waveguide 213 enclosed in an undoped silica layer 222 on a silicon substrate 224. In a specific embodiment, the silicon substrate is mounted on a support component 232, for example, a silicon submount. There are various considerations regarding alignment of the components. For example, the laser waveguide 215 is aligned to the silica waveguide 213 both vertically and horizontally with accuracies about ±2 µm. In another example, there is no direct contact between facets (output ports) of laser 215 and the silica waveguide 213. In specific example, the distance 218 between the facets is kept to about ~10-20 µm. Of course, there can be other variations, modifications, and alternatives.

In a specific embodiment, the physical separation between the DMLs on the array, and hence the separation between the AWG input waveguides, is kept large enough to minimize the thermal crosstalk, and the electrical crosstalk due to the high speed data modulations. For example, a suitable distance between lasers 214 and 215 in FIG. 2A can be about 0.3-0.5 mm in an embodiment. Of course, there can be other variations, modifications, and alternatives.

Although the above has been shown using a selected group of components for the integrated DWDM transmitter system, there can be many alternatives, modifications, and variations. For example, some of the components may be expanded and/or combined. Other components may be inserted to those noted above. Depending upon the embodiment, the arrangement of components may be interchanged with others replaced.

According to an embodiment of the present invention, after being mounted on the AlN submount with desirable spacing, the DML array bar is butt joined with the silica-on-silicon AWG as shown in FIGS. 2A and 2B. In an embodiment, the DML chips or chip arrays have integrated mode converters, and the alignment of the two array devices is relatively simple. For example, at 1,550 nm mode diameters of standard silica PLC are typically ~8-10 µm, with output beam divergence ~7-10°, similar to those of the InP chip after mode conversion. Thus, in a specific embodiment, an alignment tolerance of as large as +/−2 µm can be expected, simplifying considerably the alignment process.

According to embodiments of the invention, active alignment is required to obtain good optical coupling for every channel between the transmitter array bonded on the AlN bar and silica/silicon AWG. Once the alignment reaches the desired precision, the AlN bar is then glued on to the AWG by epoxies with good thermal conductance. Special care is taken to ensure that the joint of different materials will not crack or deform under temperature cycling due to different CTEs. In a specific embodiment, to prevent such a mechanical failure at the joint, a silicon submount with a thickness of ~1-mm is used. Silica/silicon AWG is first glued by epoxies with good thermal conductance on to the silicon submount 232 as shown in FIG. 2B to increase its thickness for a stronger joint. The two pieces are flush aligned at the side where the waveguide input is located. After the epoxy sets, this side is polished to have a good surface normal to the waveguide core. In an embodiment, the input of the AWG is coated with an antireflection coating at 1550 nm for good optical coupling as well as preventing back reflection of light into laser cavity. In a specific embodiment, the entire thickness of the AWG chip including the submount is around 2-3 mm. In alternative embodiments, more generally, the AWG submount can be of any material with similar properties as silicon. Still more generally, the AWG can be replaced by a PLC broadband coupler, or a PLC waveguide fan-in concentrator. The latter is to match the wide waveguide spacing required by the DMLs and the narrow spacing typically used in standard AWGs.

Merely as an example, an AlN bar holding an array of 12 DML transmitters spaced by 0.5 mm has preferably dimensions of approximately 1.5×2×6 mm. The 1.5×6 mm surface with conducting film electrodes is used to mount the laser chip. The output surface of the chip is chosen not to be flush with the AlN submount with a small recess of ~10-20 μm (see FIGS. 2A and 2B) to prevent direct contact with AWG as well as to ensure excellent optical coupling. The side of the AlN submount is then glued to the input side of the AWG via active alignment. The entire unit is then placed on a thermal electrical cooler (TEC) for the control of operating temperature normally set at ~25° C. Preferably, the dimensions of the TEC is chosen such that it fits to dimensions of the silicon submount holding the AWG, leaving the array bar untouched by the TEC.

According to a specific embodiment of the invention, the AWG submount uses same material as the AWG, and this joint geometry will not cause a vertical tilt of the array bar due to temperature changes. A temperature ramp from −40 to +85° C. (the standard range for storage temperatures) will have a negligible change of the recess less than +/−0.045 μm. For example, the AWG is typically operated at ~25° C. At this temperature, the center wavelengths of the DMLs are matched roughly to those of the AWG input ports, for example, 193.1 THz, 193.2 THz, 193.3 THz, etc. The center wavelengths of the AWG shift with temperature by ~0.01 nm/° C., and the center wavelengths of the InP lasers shift with temperature by ~0.1 nm/° C. Due to the manufacturing tolerance, the center wavelengths of the lasers do not fall exactly on the ITU-T grid at the TEC operating temperature. The variation is typically on the order of 1 nm. In a specific embodiment, a micro heater is placed adjacent to each DML waveguide, either on the laser chip or on the AlN laser submount. By raising the local temperature to ~0-10° C. relative to the substrate, one can fine tune the center wavelengths of the DMLs to the ITU grids Various embodiments of the invention also include hybrid integration with Vernier AWG to further improve the AWG yield and hence reduce the manufacture cost. In an embodiment, Vernier AWG compensates for the possible center wavelength shift due to the slight fabrication error in waveguide parameters such as the effective index of the waveguides by adding additional ports at both input and output. Of course, one of ordinary skill in the art will recognize other variations, modifications, and alternatives.

According to an embodiment of the present invention, a method is provided for fine adjustment of the center wavelengths of the DMLs. Due to the manufacturing tolerance, the center wavelengths of the lasers may not fall exactly on the ITU-T grid at the temperature adjustment component operating temperature. The variation, for example, is typically on the order of 1 nm. In certain embodiments of the invention, a micro heater is used to raise a temperature of a DML waveguide. For example, in a specific embodiment, a micro heater is placed adjacent to each DML waveguide, either on the laser chip or on the PLC. According to a specific embodiment of the invention, by raising the local temperature to about 0-10° C. relative to the substrate, one can fine tune the center wavelengths of the DMLs to the ITU grids. Further details of the method are discussed below with reference to FIG. 3.

Figure 3:
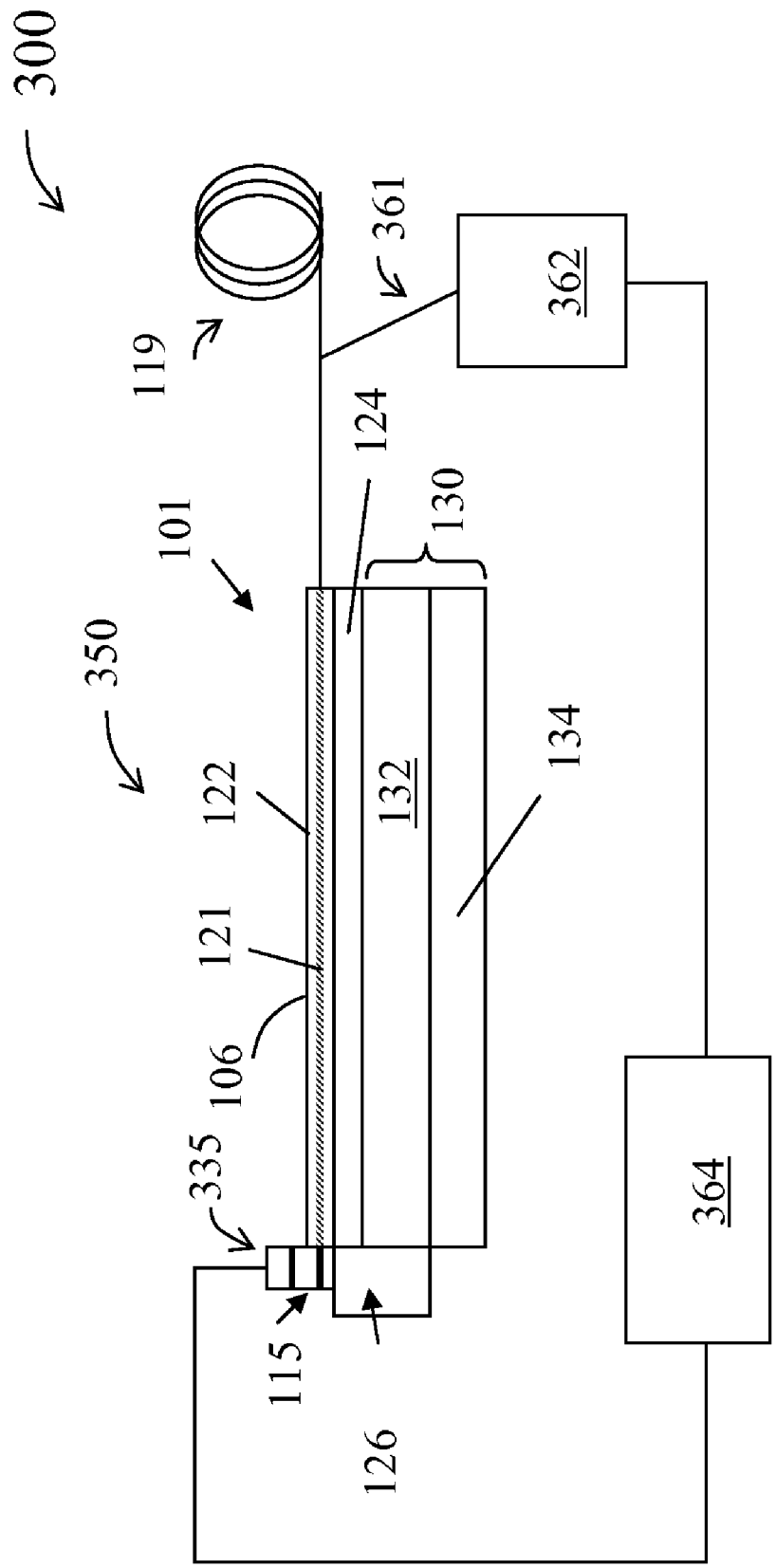
FIG. 3 a simplified view diagram of an integrated DWDM transmitter system according to another embodiment of the present invention.

FIG. 3 is a simplified view diagram of an integrated DWDM transmitter system according to another embodiment of the present invention. This diagram is merely an example, which should not unduly limit the scope of the claims herein. One of ordinary skill in the art would recognize other variations, modifications, and alternatives. As shown, integrated transmitter system 300 includes a hybrid integrated transmitter 350 similar to transmitter 100 discussed above in connection with FIGS. 1A and 1B. For easy reference, corresponding parts of the devices are marked by identical numerals. As shown, hybrid integrated transmitter 350 includes a laser 115 overlying a support component such as an aluminum nitride (AlN) submount 126, a silica waveguide 121 formed in a silicon bench 101 which includes undoped silica layer 122 overlying a silicon layer 124. The silicon substrate 124 overlies a support component 130, which includes submount 132, e.g., a silicon substrate, and a temperature adjustment component 134, such as a thermal electric cooler (TEC), and. In a specific embodiment, integrated transmitter system 300 also includes a micro heater 335 in a vicinity of the laser 115, an optical analyzer 362, and a controller 364. The optical analyzer 362 is optically coupled to an output waveguide in the integrated DWDM transmitter, which may be optically coupled to an optical communication system through optical fiber 119. The controller 364 is electrically coupled to the optical analyzer 362 and the micro heater 335. In FIG. 3, the micro heater 335 is shown to be on top of the laser 115. Depending on the embodiment, the micro heater can be placed in a location so as to adjust the temperature of the laser. For example, the micro heater can be placed on the silicon substrate and adjacent to the laser. In an embodiment, a micro heater is placed adjacent to each laser, either on the laser chip or on the PLC. In a specific embodiment, the micro heater is a resistive element, such as a metal strip, deposited in a vicinity of laser 115 as shown in FIG. 3.

Although the above has been shown using a selected group of components for the integrated DWDM transmitter system, there can be many alternatives, modifications, and variations. For example, some of the components may be expanded and/or combined. Other components may be inserted to those noted above. Depending upon the embodiment, the arrangement of components may be interchanged with others replaced. For example, integrated transmitter 350 may include features in transmitter 200 discussed above in connection with FIGS. 2A and 2B.

Figure 4A:
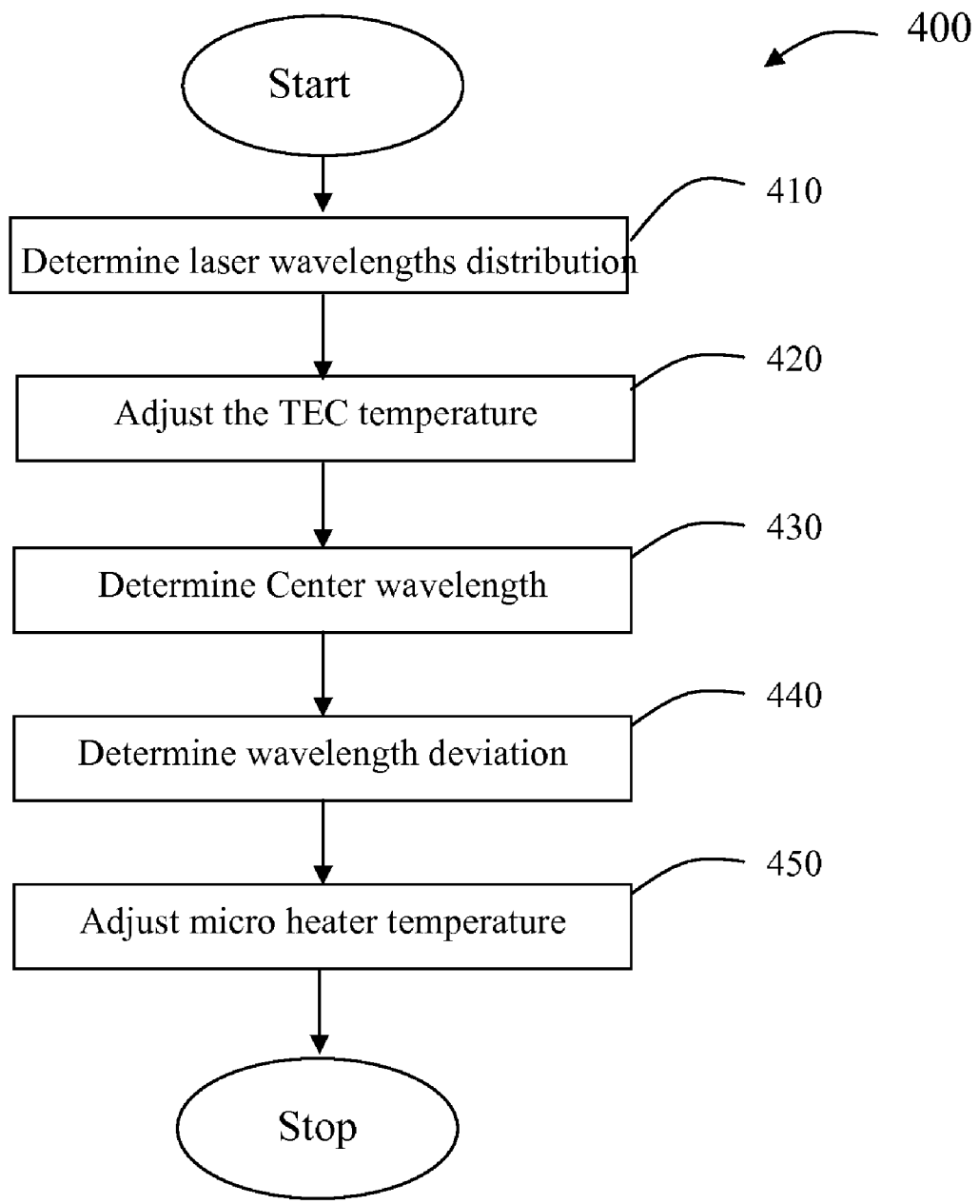
FIG. 4A is a simplified flowchart of a method for maintaining a target wavelength in an integrated DWDM transmitter according to an embodiment of the invention.
Figure 4B:
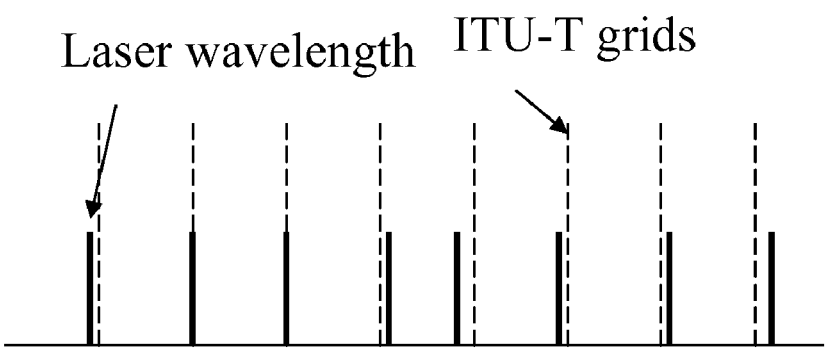
FIGS. 4B-4D are simplified wavelength diagrams illustrating the method for maintaining a target wavelength in an integrated DWDM transmitter according to the above embodiment of the invention.
Figure 4C:
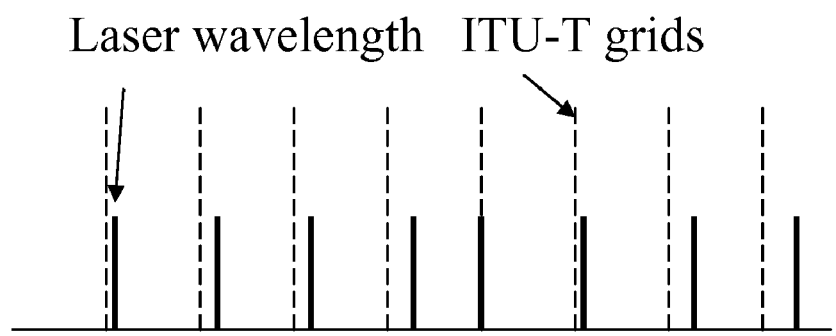
Figure 4D:
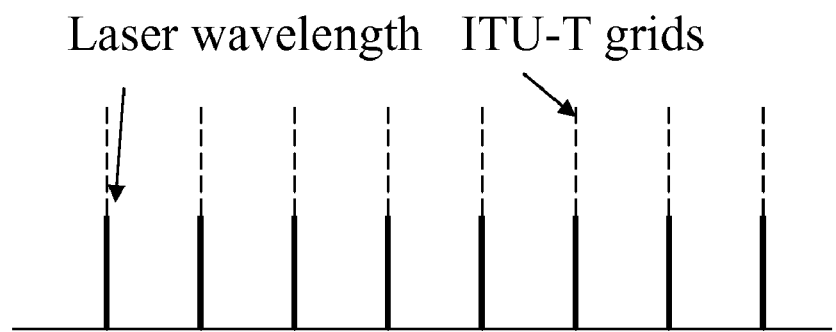

FIG. 4A is a simplified flowchart of a method for maintaining a target wavelength in an integrated DWDM transmitter according to an embodiment of the invention. FIGS. 4B-4D are simplified wavelength diagrams according to the method. These diagrams are merely examples, which should not unduly limit the scope of the claims herein. One of ordinary skill in the art would recognize other variations, modifications, and alternatives. The method can be briefly outlined below, with reference to the integrated DWDM system in FIG. 3, the flowchart in FIG. 4A, and the wavelength diagrams in FIG. 4B-4D.

1. (Process 410) Determine laser wavelengths distribution at a predetermined global TEC temperature. An example of wavelength distribution at TEC temperature of 25° C. is shown in FIG. 4B.
2. (Process 420) Adjust the TEC to a second global temperature to shift the all laser wavelengths to below the target wavelengths for the corresponding ITU-T grids. An example is shown in FIG. 4C.

3. (Process 430) For each laser, determine a center frequency at an output waveguide, using the optical analyzer 362;
4. (Process 440) Determine a deviation between the measured center wavelength and the target wavelength, using the controller 364;
5. (Process 450) Adjust a temperature of the micro heater 335, using the controller 364, to increase the center wavelength of the laser to approach the corresponding target wavelength according to the ITU-T grids. FIG. 4D is an example of wavelengths shifted to the corresponding target wavelengths according to the ITU-T grids.

The above sequence of processes provides a method for maintaining a target wavelength associated with an integrated DWDM transmitter according to an embodiment of the invention. As shown, the method uses a combination of processes including a way of using the TEC to shift all laser wavelengths to the shorter wavelength side of the grids and using local micro heaters to increase the local temperature at each laser as needed to shift all laser wavelengths to the ITU-T grids. Other alternatives can also be provided in which steps are added, one or more steps are removed, or one or more steps are provided in a different sequence without departing from the scope of the claims herein. Further details of the present method can be found throughout the present specification.

Figure 5:
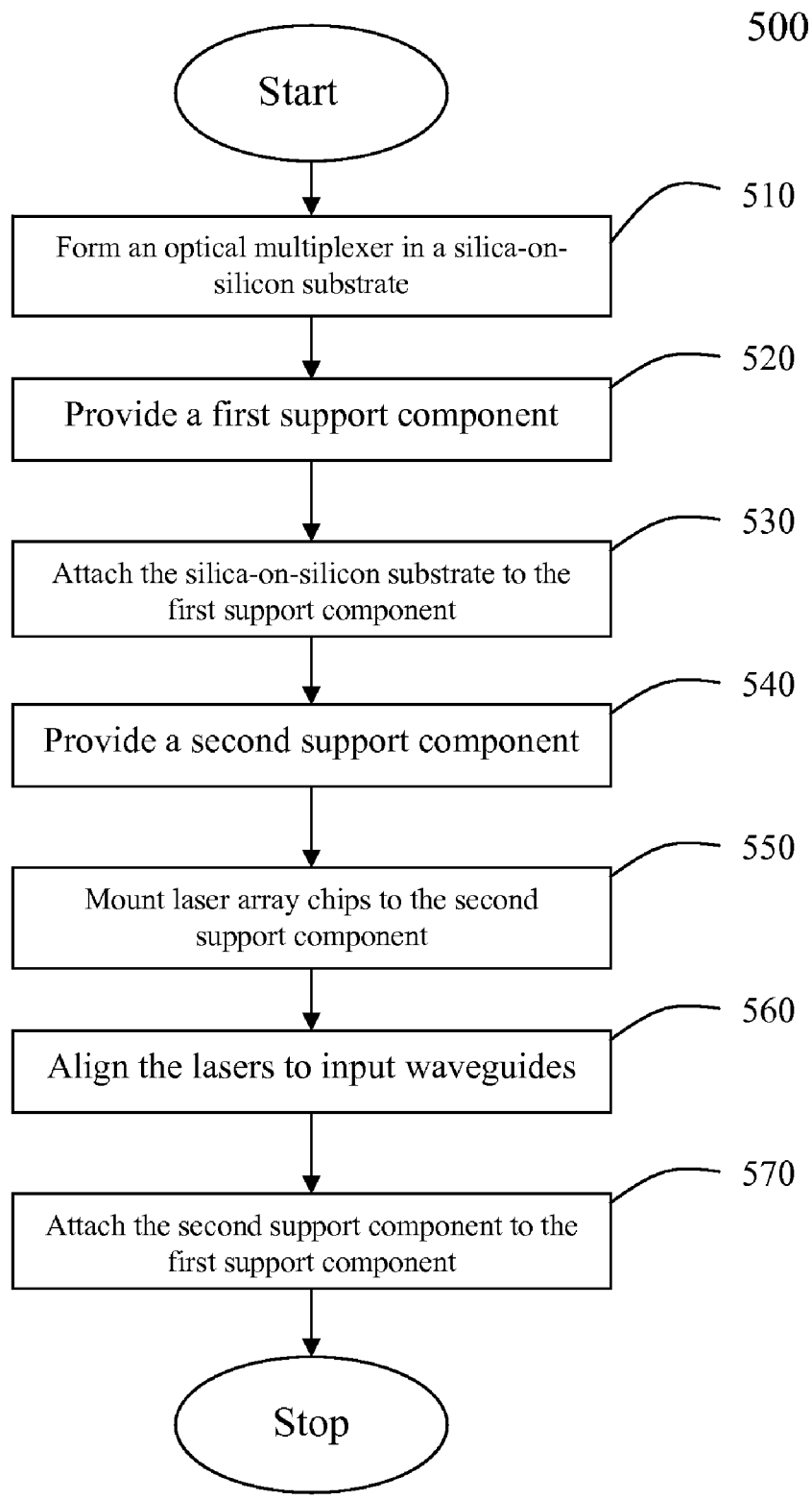
FIG. 5 is a simplified flowchart of a method for making in an integrated DWDM transmitter according to another embodiment of the present invention.

FIG. 5 is a simplified flowchart of a method for making an integrated DWDM transmitter according to an embodiment of the invention. This diagram is merely an example, which should not unduly limit the scope of the claims herein. One of ordinary skill in the art would recognize other variations, modifications, and alternatives. The method can be briefly outlined below, with reference to the flowchart in FIG. 5.

1. (Process 510) Form an optical multiplexer in a silica-on-silicon substrate;
2. (Process 520) Provide a first support component;
3. (Process 530) Attach the silica-on-silicon substrate to the first support component;
4. (Process 540) Provide a second support component;
5. (Process 550) Mount one or more semiconductor laser array chips to the second support component;
6. (Process 560) Align the lasers to a corresponding input waveguides; and
7. (Process 570) Attach the second support component to the first support component.

As shown, FIG. 5 provides a method for making an integrated DWDM transmitter apparatus. The method includes (Process 510) forming an optical multiplexer in a silica-on-silicon substrate. The silica-on-silicon substrate includes a silica layer overlying a silicon layer, and the optical multiplexer has a plurality of input waveguides and at least an output waveguide. In an embodiment, the optical multiplexer includes an arrayed waveguide grating. In a specific embodiment, forming the optical multiplexer includes the following processes.

1. forming a first un-doped silica sub-layer on the silicon layer;
2. forming a doped silica sub-layer on the first un-doped silica sub-layer;
3. etching at least a second portion of the doped silica sub-layer; and
4. depositing a second un-doped silica sub-layer on the etched doped silica sub-layer and the first un-doped silica sub-layer.

In Process 520, the method includes providing a first support component. A coefficient of thermal expansion of the first support component is substantially matched to a coefficient of thermal expansion of the silicon layer. The first support component has a thickness that allows alignment between each of the one or more lasers and a corresponding one of the plurality of input waveguides. As an example, the first component can be a silicon substrate characterized by a thickness of approximately 1 mm. In Process 530, the method includes attaching the silica-on-silicon substrate to the first support component.

According to Process 540, a second support component is provided. In Process 550, one or more semiconductor laser array chips are mounted to a top surface of the second support component. A coefficient of thermal expansion of the one or more semiconductor laser array chips is substantially matched to a coefficient of thermal expansion of the second support component. Each of the one or more semiconductor laser array chips includes one or more lasers. In an embodiment, the laser array chips include one or more InP lasers. For matching of the coefficients of thermal expansion, the second support component may be an aluminum nitride (AlN) submount. In a specific embodiment, the laser array chips are mounted on the second support component using a soldering process. In a specific embodiment, a micro heater is mounted in a vicinity of each laser for fine tuning a center frequency of the laser.

In Process 560, the method also includes aligning each of the lasers to a corresponding one of the plurality of input waveguides for providing an optical coupling. Additionally, the method includes attaching the second support component to the first support component (Process 570). In an embodiment, the second support component is butt joined to the side surface of the first support component. For example, the second support component can be glued to the first support component by epoxies with good thermal conductance. In another embodiment, the method also includes adding a temperature adjustment component underlying the first support component. As an example, the method is implemented according to FIGS. 1A, 1B, 2A, and 2B and the associated text.

The above sequence of processes provides a method for making an integrated DWDM transmitter apparatus according to an embodiment of the invention. As shown, the method uses a combination of processes including a way of making an optical multiplexer in a silica-on-silicon substrate and mounting laser array chips on a portion of the substrate. Other alternatives can also be provided in which steps are added, one or more steps are removed, or one or more steps are provided in a different sequence without departing from the scope of the claims herein. Further details of the present method can be found throughout the present specification.

In a specific embodiment, the DML chips, the AWG, the submount, and the TEC, after proper electrical wire bonding, are put inside a single package to form the DWDM transmitter. In an embodiment, the transmitter has multiple electrical inputs that control and monitor the temperatures of the AWG and DMLs, the DC currents and RF modulations of the DMLs, etc. In a particular embodiment, the transmitter has a single optical output, typically through an optical fiber pigtail, sending out the multiple-channel DWDM signals. Of course there can be other variations, modifications, and alternatives.

Figure 6A:
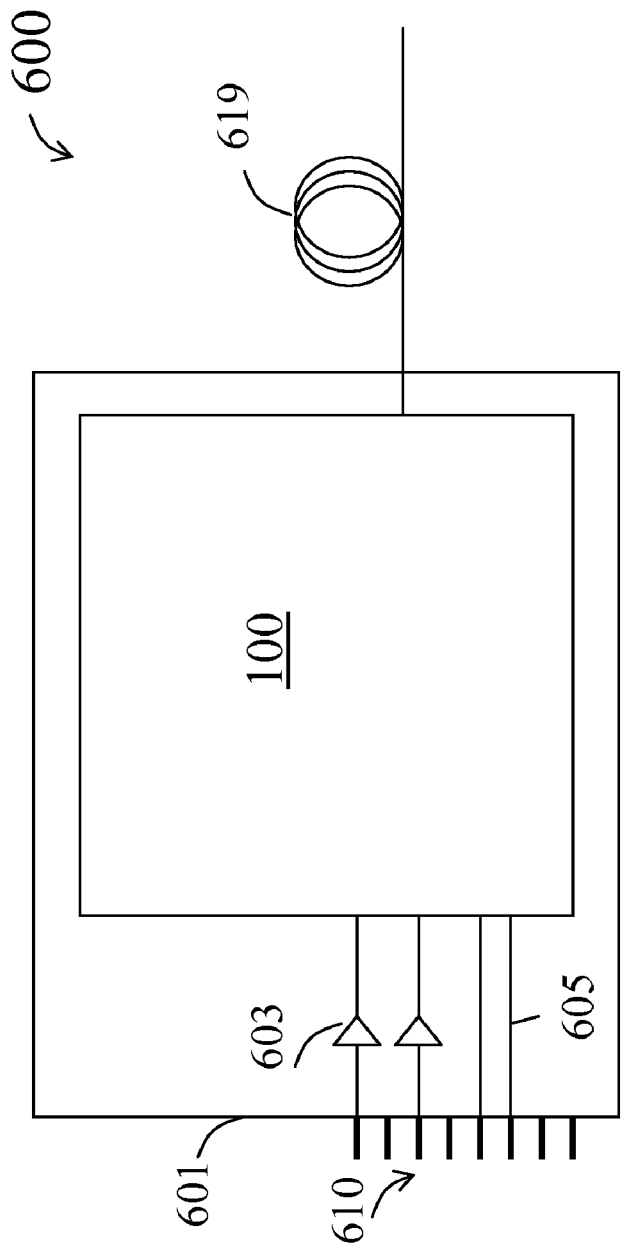
FIG. 6A is a simplified top view diagram of a packaged hybrid integrated DWDM transmitter according to yet another embodiment of the present invention.
Figure 6B:
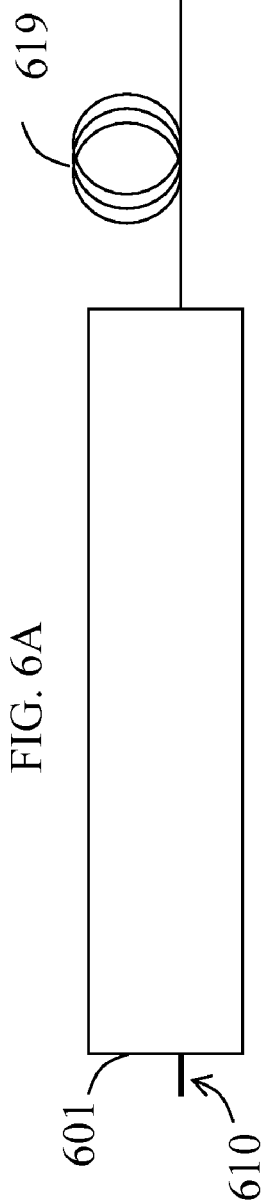
FIG. 6B is a simplified cross-sectional view diagram of the packaged hybrid integrated DWDM transmitter of FIG. 4A according to an embodiment of the invention.

FIG. 6A is a simplified top view diagram of a packaged hybrid integrated DWDM transmitter according to yet another embodiment of the present invention. FIG. 6B is a simplified cross-sectional view diagram of the packaged hybrid integrated DWDM transmitter of FIG. 6A. These diagrams are merely examples, which should not unduly limit the scope of the claims herein. One of ordinary skill in the art would recognize other variations, modifications, and alternatives. As shown in FIG. 6A, packaged integrated dense wavelength division multiplexing (DWDM) transmitter apparatus 600 is capable of converting multiple electrical signals to a multiple-channel DWDM signal. In a specific embodiment, transmitter apparatus 600 includes a plurality of input terminals 610 for receiving the multiple electrical signals and a functional block 100 inside a package 601. In an embodiment, functional block 100 may be a hybrid integrated transmitter similar to block 100 discussed above in connection with FIGS. 1A and 1B.

Block 100 in transmitter apparatus 600 is discussed below with reference to FIGS. 1A and 1B. In a specific embodiment, hybrid integrated transmitter 100 includes a support component 132 and a silicon bench 101 which includes a silica-on-silicon substrate overlying the support component. The silica-on-silicon substrate includes a silica layer 122 overlying a silicon layer 124.

The hybrid integrated transmitter 100 also includes one or more semiconductor laser array chips (e.g. 114 and 115), which are coupled to the input terminals 610 for receiving the multiple electrical signals as shown in FIG. 6A. The laser array chips convert the multiple electrical signals to corresponding multiple optical signals. The one or more semiconductor laser array chips (e.g. 114 and 115) overlie overlies a second support component 126. In a specific embodiment, each of the one or more laser array chips (e.g. 114 and 115) includes two or more lasers.

The hybrid integrated transmitter 100 also includes an optical multiplexer 110 which may include an arrayed waveguide grating (AWG) 116 made in a silica-on-silicon planar lightwave circuit (PLC) shown in FIGS. 1A and 1B. The optical multiplexer 110 is coupled to the one or more semiconductor laser array chips (e.g. 114 and 115) for converting the multiple optical signals to a multiple-channel DWDM signal. As shown, the optical multiplexer 110 is located within the silica layer 122 overlying at least a portion of the silicon layer 124. In an embodiment, the optical multiplexer 110 includes a plurality of input waveguides 113, each of which is coupled to a corresponding laser in the one or more laser array chips for receiving a corresponding optical signal. The optical multiplexer 110 converts the multiple optical signals to a multiple-channel DWDM signal, which may be transmitted outside the transmitter through an output waveguide 112. Of course, there may be other variations, modifications, and alternatives. For example, depending on the embodiments, there may be more than one output waveguide in the transmitter 100.

In an embodiment, input terminals 610 are coupled to the laser array chips in transmitter 100 via electrical connections such as 605. In some embodiment, packaged DWDM transmitter 600 may include electrical amplifiers 603 for boosting the electrical signals and coupling them to the laser array chips. In an embodiment, the output waveguide 112 of the transmitter may be coupled to an optical fiber 619 for transmitting the multiple-channel DWDM signal to, for example, an external optical communication system. In a specific embodiment, the transmitter also has multiple electrical input and output connections for control and monitor of the temperature of the AWG and other components of the packaged transmitter apparatus 600.

Depending upon the embodiment, the present invention includes various features, which may be used. These features include the following:

1. A hybrid integrated DWDM transmitter array including one or more multiple direct-modulated laser (DML) array chips made of InP and an arrayed waveguide grating (AWG) made of silica-on-silicon planar lightwave circuit (PLC);
2. An Integrating laser chips or array chips on an aluminum nitride submount to prevent CTE mismatch and the complexities associated with the mismatch. This array bar on AlN is then butt joined with PLC for high coupling efficiency;
3. A method and system for using micro heaters to adjust a center frequency of each individual laser in the transmitter;
4. A method of using antireflective (AR) coating to prevent back reflection of light in to laser cavity; and
5. A method of using a silicon submount to increase the thickness of the AWG chip for a strong butt joint.

As shown, the above features may be in one or more of the embodiments. These features are merely examples, which should not unduly limit the scope of the application. One of ordinary skill in the art would recognize many variations, modifications, and alternatives.

Many benefits are achieved by way of the present invention over conventional techniques. For example, in certain embodiments, the invention provides a method of integrating various optical components using excellent CTE match between InP and AlN as well as good thermal conductivity of AlN. According to embodiments of the present invention, the method is readily scaleable to large laser array chips for further reduction of cost and system footprint as well as increasing product reliability and manufacture yield. According to certain embodiments of the invention, large array chips can enable further improvements of optical coupling between AWG and transmitters. For example, vertical variation in height relative to the waveguides can be minimized from transmitter to transmitter if these transmitters are formed on a single array chip. In contrast, large array chips can not be used in conventional flip-chip bonding due to CTE mismatch and, therefore, the vertical height varies from chip to chip, giving rise to non-uniform coupling efficiencies.

Some embodiments of the present invention provides techniques that reduce the complexities in product manufacturing in that quality control can be easily carried out at different levels of the integration. For example, the laser array on AlN may be manufactured by a specialist, and the final integration can be reduced to a simple alignment of the array with AWG and can be manufactured by using conventional packaging houses in the industry. Therefore, performance deviation of the final product is minimal and its packaging yield may be substantially higher than integrating InP chips directly on PLC. In specific embodiments, techniques are provided for using a butt joint method for optical coupling between laser array and AWG. As a result, the coupling efficiency is expected to be high. In an embodiment, both laser/waveguide surfaces can be AR coated to reduce reflection loss as well as possible back reflection into the laser cavity for high laser performance and stability.

It is also understood that the examples and embodiments described herein are for illustrative purposes only and that various modifications or changes in light thereof will be suggested to persons skilled in the art and are to be included within the spirit and purview of this application and scope of the appended claims.

What is claimed is:

1. An integrated DWDM transmitter apparatus, the apparatus comprising:
   a first support component;

a silica-on-silicon substrate overlying the first support component, the silica-on-silicon substrate including a silica layer overlying a silicon layer, a coefficient of thermal expansion of the first support component being substantially matched to a coefficient of thermal expansion of the silicon layer;

an optical multiplexer within the silica layer, the optical multiplexer including a plurality of input waveguides and at least an output waveguide;

a second support component attached to a side surface of the first support component; and one or more semiconductor laser array chips overlying the second support component, a coefficient of thermal expansion of the one or more semiconductor chips being substantially matched to a coefficient of thermal expansion of the second support component, each of the one or more laser array chips including multiple lasers, each of the multiple lasers being optically coupled to a corresponding one of the plurality of input waveguides.

2. The apparatus of claim 1 wherein the first support component comprises a silicon substrate characterized by a thickness that allows alignment between each of the multiple lasers and a corresponding one of the plurality of input waveguides.

3. The apparatus of claim 1 wherein the first support component comprises a silicon substrate characterized by a thickness of approximately 1 mm.

4. The apparatus of claim 1 wherein the second support component comprises aluminum nitride (AlN).

5. The apparatus of claim 1 wherein the second support component is butt joined to the side surface of the first support component.

6. The apparatus of claim 1 wherein the optical multiplexer includes an arrayed waveguide grating.

7. The apparatus of claim 1 wherein the multiple lasers of the one or more semiconductor laser array chips are InP lasers.

8. The apparatus of claim 1 further comprising a temperature adjustment component underlying the first support component.

9. The apparatus of claim 8 wherein the temperature adjustment component includes a thermal electric cooler (TEC).

10. The apparatus of claim 1 further comprising a micro heater in a vicinity of each laser for fine tuning a center frequency of the laser.

11. An integrated DWDM transmitter apparatus, the apparatus comprising:

a first support component;

a silica-on-silicon substrate overlying the first support component, the silica-on-silicon substrate including a silica layer overlying a silicon layer, a coefficient of thermal expansion of the first support component being substantially matched to a coefficient of thermal expansion of the silicon layer;

an optical multiplexer within the silica layer, the optical multiplexer including a plurality of input waveguides and at least an output waveguide;

a second support component attached to a side surface of the first support component;

one or more semiconductor laser array chips overlying the second support component, a coefficient of thermal expansion of the one or more semiconductor chips being substantially matched to a coefficient of thermal expansion of the second support component, each of the one or more laser array chips including multiple lasers, each of the multiple lasers being optically coupled to a corresponding one of the plurality of input waveguides; and a plurality of micro heaters, each of the plurality of micro heaters being located adjacent to a corresponding one of the multiple lasers.

12. The apparatus of claim 11 wherein each of the multiple lasers of the one or more semiconductor laser array chips are InP lasers, and the second support component comprises aluminum nitride (AlN).

13. A method for making an integrated DWDM transmitter apparatus, the method comprising:

forming an optical multiplexer in a silica-on-silicon substrate, the silica-on-silicon substrate including a silica layer overlying a silicon layer, the optical multiplexer including a plurality of input waveguides and at least an output waveguide;

providing a first support component, a coefficient of thermal expansion of the first support component being substantially matched to a coefficient of thermal expansion of the silicon layer;

attaching the silica-on-silicon substrate to the first support component;

providing a second support component;

mounting one or more semiconductor laser array chips to a top surface of the second support component, a coefficient of thermal expansion of the one or more semiconductor laser array chips being substantially matched to a coefficient of thermal expansion of the second support component, each of the one or more semiconductor laser array chips including multiple lasers;

aligning each of the multiple lasers to a corresponding one of the plurality of input waveguides for providing an optical coupling; and attaching the second support component to the first support component.

14. The method of claim 13 wherein the forming the optical multiplexer comprises:

forming a first un-doped silica sub-layer on the silicon layer;

forming a doped silica sub-layer on the first un-doped silica sub-layer;

etching at least a second portion of the doped silica sub-layer; and depositing a second un-doped silica sub-layer on the etched doped silica sub-layer and the first un-doped silica sub-layer.

15. The method of claim 13 wherein the first support component comprises a silicon substrate characterized by a thickness that allows alignment between the each of the one or more lasers and a corresponding one of the plurality of input waveguides.

16. The method of claim 13 wherein the first support component comprises a silicon substrate characterized by a thickness of approximately 1 mm.

17. The method of claim 13 wherein the second support component comprises aluminum nitride (AlN).

18. The method of claim 13 wherein the second support component is butt joined to the side surface of the first support component.

19. The method of claim 13 wherein the optical multiplexer includes an arrayed waveguide grating.

20. The method of claim 13 wherein the multiple lasers of the one or more semiconductor laser array chips are InP lasers.

21. The method of claim 13 further comprising adding a temperature adjustment component underlying the first support component.

22. The method of claim 13 further comprising mounting a micro heater in a vicinity of each laser for fine tuning a center frequency of the laser.

23. An integrated dense wavelength division multiplexing (DWDM) transmitter apparatus that converts multiple electrical signals to a multiple-channel DWDM signal, the apparatus comprising:

a plurality of input terminals for receiving the multiple electrical signals;

a first support component;

a silica-on-silicon substrate overlying the first support component, the silica-on-silicon substrate including a silica layer overlying a silicon layer, a coefficient of thermal expansion of the first support component being substantially matched to a coefficient of thermal expansion of the silicon layer;

a second support component attached to the silica-on-silicon substrate and the first support component;

one or more semiconductor laser array chips overlying the second support component, the one or more semiconductor laser array chips being coupled to the plurality of input terminals for receiving the multiple electrical signals and converting the multiple electrical signals to corresponding multiple optical signals, each of the one or more laser array chips including multiple lasers; and an optical multiplexer coupled to the one or more semiconductor laser array chips for converting the multiple optical signals to the multiple-channel DWDM signal, the optical multiplexer being located in the silica-on-silicon substrate, the optical multiplexer including:

a plurality of input waveguides each of which coupled to a corresponding laser for receiving a corresponding optical signal; and at least an output waveguide for outputting the multiple-channel DWDM signal.

24. The apparatus of claim 23 wherein the first support component comprises a silicon substrate characterized by a thickness that allows an alignment between the each of the one or more lasers and a corresponding one of the plurality of input waveguides.

25. The apparatus of claim 23 wherein the first support component comprises a silicon substrate characterized by a thickness of approximately 1 mm.

26. The apparatus of claim 23 wherein the second support component comprises aluminum nitride (AlN).

27. The apparatus of claim 23 wherein the second support component is butt joined to the side surface of the first support component.

28. The apparatus of claim 23 wherein the optical multiplexer includes an arrayed waveguide grating.

29. The apparatus of claim 23 wherein the multiple lasers of the one or more semiconductor laser array chips are InP lasers.

30. The apparatus of claim 23 further comprising a micro heater in a vicinity of each laser for fine tuning a center frequency of the laser.

31. The apparatus of claim 23 wherein the first support component comprises a silicon substrate characterized by a thickness that allows an alignment between the each of the one or more lasers and a corresponding one of the plurality of input waveguides, the second support component comprises aluminum nitride (AlN), and the second support component is butt joined to the side surface of the first support component.

* * * * *